(12) United States Patent
Wang et al.

(10) Patent No.: US 7,478,750 B2
(45) Date of Patent: Jan. 20, 2009

(54) READING DEVICE OF SCANNING APPARATUS

(75) Inventors: Chung-Kai Wang, Taipei (TW); Yu-Cheng Chang, Taipei (TW); Hsi-Yu Chen, Taipei (TW)

(73) Assignee: Transpacific Plasma, LLC, Taipei (TW)

( * ) Notice: Subject to any disclaimer, the term of this patent is extended or adjusted under 35 U.S.C. 154(b) by 527 days.

(21) Appl. No.: 11/189,671

(22) Filed: Jul. 26, 2005

(65) Prior Publication Data

US 2006/0278707 A1 Dec. 14, 2006

(30) Foreign Application Priority Data

Jun. 10, 2005 (TW) .............................. 94119291 A

(51) Int. Cl.
*G06K 7/00* (2006.01)
*G06K 7/10* (2006.01)
*G06K 7/14* (2006.01)
*H01J 5/02* (2006.01)
*H01J 40/14* (2006.01)
*H04N 1/40* (2006.01)
*H04N 1/04* (2006.01)

(52) U.S. Cl. .................. 235/439; 235/454; 250/239; 358/483; 358/471

(58) Field of Classification Search ............. 358/471, 358/474, 483, 406, 472; 235/439, 454, 435, 235/462.35, 462.43; 257/431–433; 250/239, 250/208.1, 216, 234–236
See application file for complete search history.

(56) References Cited

U.S. PATENT DOCUMENTS

| | | | | |
|---|---|---|---|---|
| 4,424,534 A * | 1/1984 | Nagane | ..................... | 358/451 |
| 4,742,401 A * | 5/1988 | Andree et al. | ............... | 358/493 |
| 4,771,473 A * | 9/1988 | Sugiura | ..................... | 382/298 |
| 4,823,195 A * | 4/1989 | Ito | ............................ | 358/494 |
| 5,019,703 A * | 5/1991 | Boyd et al. | ................ | 250/208.1 |
| 5,097,290 A * | 3/1992 | Watanabe | .................. | 355/60 |
| 5,097,519 A * | 3/1992 | Sugiura | ..................... | 382/298 |
| 5,113,268 A * | 5/1992 | Yoshida et al. | ............ | 358/474 |
| 5,371,614 A * | 12/1994 | Ito | ............................ | 358/487 |
| 5,386,404 A * | 1/1995 | Koyama | .................. | 369/44.23 |
| 5,432,622 A * | 7/1995 | Johnston et al. | ............ | 358/474 |
| 5,457,550 A * | 10/1995 | Baba et al. | ................... | 359/18 |
| 5,589,972 A * | 12/1996 | Tellam et al. | ............... | 359/196 |
| 5,633,745 A * | 5/1997 | Chen et al. | ................... | 359/201 |
| 5,696,609 A * | 12/1997 | Cresens et al. | ............. | 358/475 |
| 5,724,159 A * | 3/1998 | Nakagawa et al. | .......... | 358/474 |
| 6,088,146 A * | 7/2000 | Takeshita et al. | ........... | 359/204 |
| 6,157,467 A * | 12/2000 | Tsai | ........................... | 358/483 |
| 6,169,622 B1* | 1/2001 | Tsai et al. | .................... | 359/210 |
| 6,404,515 B1* | 6/2002 | Onda et al. | ................. | 358/474 |
| 6,552,835 B2* | 4/2003 | Huang | ........................ | 359/196 |
| 6,603,580 B1* | 8/2003 | Taillie | ........................ | 358/474 |
| 6,707,583 B1* | 3/2004 | Tsai et al. | ................... | 358/497 |

(Continued)

*Primary Examiner*—Daniel Walsh
(74) *Attorney, Agent, or Firm*—Workman Nydegger

(57) ABSTRACT

By combining a sensing module having a lens and an image sensor with a carriage module having a mirror set, a reading device of a scanning apparatus is assembled. The sensing module further includes two channels at bilateral sides of the lens and two guiding slots disposed on external sides of the channels. The carriage module further includes two linear tracks corresponding to the channels and two bolt hole pedestals corresponding to the guiding slots. The sensing module is glided on the carriage module when the linear tracks are embedded in corresponding channels, thereby correcting the desired magnification.

20 Claims, 4 Drawing Sheets

U.S. PATENT DOCUMENTS

| | | | |
|---|---|---|---|
| 6,909,085 B2 * | 6/2005 | Huang ........................ 250/239 |
| 6,992,802 B2 * | 1/2006 | Hsiao et al. .................. 358/474 |
| 7,274,494 B2 * | 9/2007 | Hsiao et al. .................. 358/474 |
| 7,298,530 B2 * | 11/2007 | Chen ........................... 358/497 |
| 2001/0050784 A1 * | 12/2001 | Lam et al. ................... 358/474 |
| 2002/0054376 A1 * | 5/2002 | Wada .......................... 358/472 |
| 2002/0092967 A1 * | 7/2002 | Matsumoto ............... 250/208.1 |
| 2002/0159123 A1 * | 10/2002 | Sheng et al. ................. 359/212 |
| 2002/0186475 A1 * | 12/2002 | Huang et al. ................ 359/618 |
| 2003/0011830 A1 * | 1/2003 | Miyatake .................... 358/513 |
| 2003/0030854 A1 * | 2/2003 | Huang et al. ................ 358/498 |
| 2003/0090747 A1 * | 5/2003 | Fang et al. .................. 358/498 |
| 2003/0174367 A1 * | 9/2003 | Huang et al. ................ 358/474 |
| 2003/0214687 A1 * | 11/2003 | Tomaru ...................... 358/513 |
| 2004/0100662 A1 * | 5/2004 | Lam .......................... 358/451 |
| 2004/0108380 A1 * | 6/2004 | Tseng et al. ................ 235/454 |
| 2004/0211893 A1 * | 10/2004 | Huang ........................ 250/239 |
| 2005/0063025 A1 * | 3/2005 | Hayashide .................. 358/497 |
| 2006/0077481 A1 * | 4/2006 | Hsiao et al. ................. 358/474 |
| 2006/0278707 A1 * | 12/2006 | Wang et al. ................. 235/454 |
| 2007/0019528 A1 * | 1/2007 | Lee ....................... 369/112.29 |
| 2007/0051810 A1 * | 3/2007 | Chang ........................ 235/454 |
| 2007/0103738 A1 * | 5/2007 | Miyatake .................... 358/474 |
| 2007/0206239 A1 * | 9/2007 | Huang et al. ................ 358/496 |
| 2007/0216969 A1 * | 9/2007 | Nishina ...................... 358/509 |

* cited by examiner

READING DEVICE OF SCANNING APPARATUS

FIELD OF THE INVENTION

The present invention relates to a reading device of a scanning apparatus, and more particularly to a reading device of a scanning apparatus, which is assembled by combining a carriage module with a sensing module.

BACKGROUND OF THE INVENTION

Referring to FIG. 1, the operation principle of a common scanning apparatus is illustrated. Firstly, the light emitted from a light source 111 is projected onto an object 12 to be scanned. The light reflected from the scanned object is successively reflected by plural mirrors 112, and then focused by a lens 113. The focused light is then imaged onto an image sensor 114 such as a charge couple device (CCD) so as to convert the optical signals into analog electrical signals. Afterwards, the analog electrical signals are converted into digital signals by an analog-digital converter (not shown) to be outputted. In the scanning apparatus 1, the plural reflective mirrors 112, the lens 113 and the image sensor 114 are included in a reading device 11. During operation, the reading device 11 is driven by a driving device (not shown) to scan the object 12. As known, the relative distances between the reflective mirrors 112, the lens 113 and the image sensor 14 have been precisely computed. The distance from the object 12 to the center of the lens 113 is defined as an objective distance. Whereas, the distance between the lens 113 and the image sensor 114 is defined as an image distance. The ratio of the image distance to the objective distance is defined as a magnification of the reading device 11.

In order to precisely image the object 12 onto the image sensor 114, during the process of assembling the reading device 11, the assembler should repeatedly adjust the position of the lens 113 relative to the image sensor 114 in the optical path until the ratio of the image distance to the objective distance (i.e. the magnification of the reading device 11) is desirable. Therefore, it is important to precisely and simply adjust the position of the lens 113 relative to the image sensor 114 during the process of assembling the reading device while maintaining the desired magnification of the reading device 11.

SUMMARY OF THE INVENTION

In view of the above-described disadvantages of repeatedly adjusting the position of the lens relative to the image sensor in the optical path to achieve the desired magnification, a reading device of a scanning apparatus according to the present invention has been developed through diligent experience and research. It is an object of the present invention to simplify the process of correcting the reading device in a quick and precise manner.

The object of the present invention is achieved by combining a sensing module having a lens and an image sensor with a carriage module having a mirror set. The sensing module further comprises two channels at bilateral sides of the lens and two guiding slots disposed on external sides of the channels. The carriage module further comprises two linear tracks corresponding to the channels and two bolt hole pedestals corresponding to the guiding slots. The sensing module is glided on the carriage module when the linear tracks are embedded in corresponding channels, thereby correcting the desired magnification.

In an embodiment, the reading device further comprises two screws penetrating through corresponding guiding slots and screwed into corresponding bolt hole pedestals such that the sensing module is combined with the carriage module.

In an embodiment, the reading device further comprises a resilient element arranged between each screw and each guiding slot.

In an embodiment, the resilient element is a spring.

In an embodiment, the reading device further comprises an injection hole on the channel of the sensing module, wherein a portion of the linear track is exposed to the injection hole when the sensing module is combined with the carriage module.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
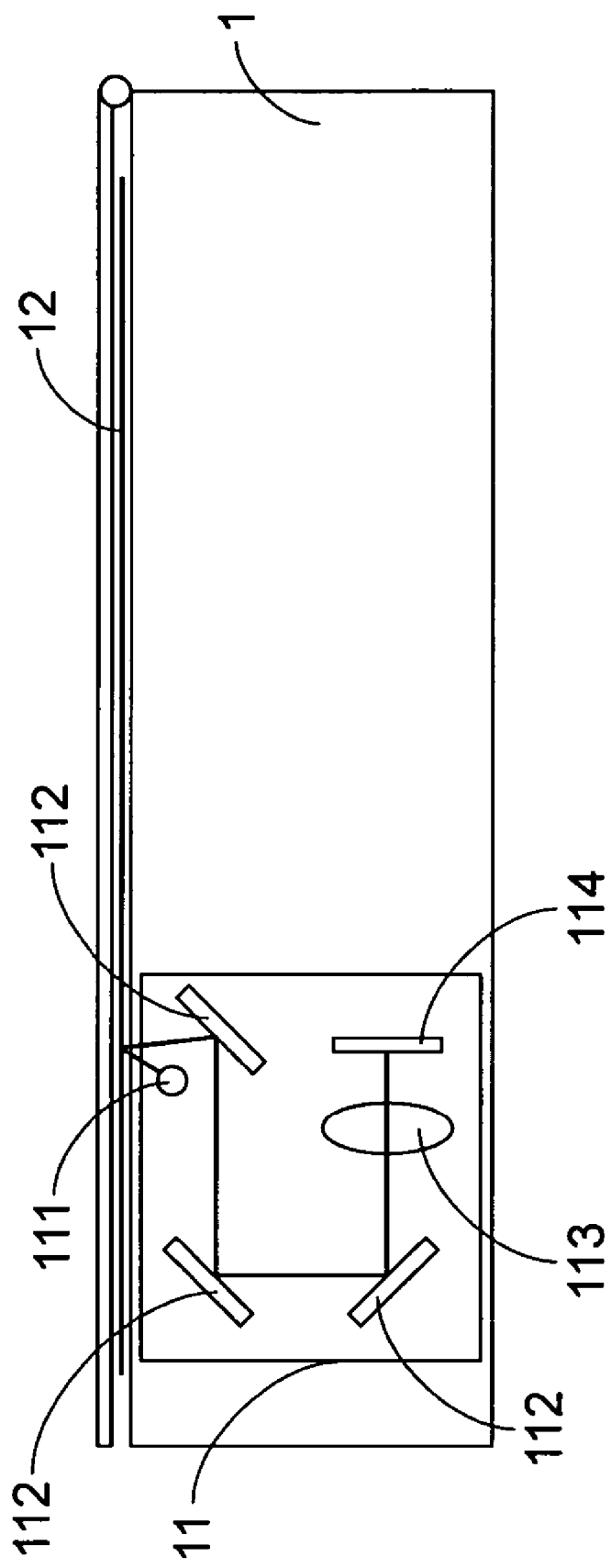
FIG. 1 is a schematic view of a conventional scanning apparatus.

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed. The schematic drawings, not to scale, are employed to illustrate the specific features of the present invention. In addition, the elements or structures in the drawings are not limited to the precise form disclosed. Unless specifically stated, the individual element may be extended to include multiple elements or structures.

Figure 2:
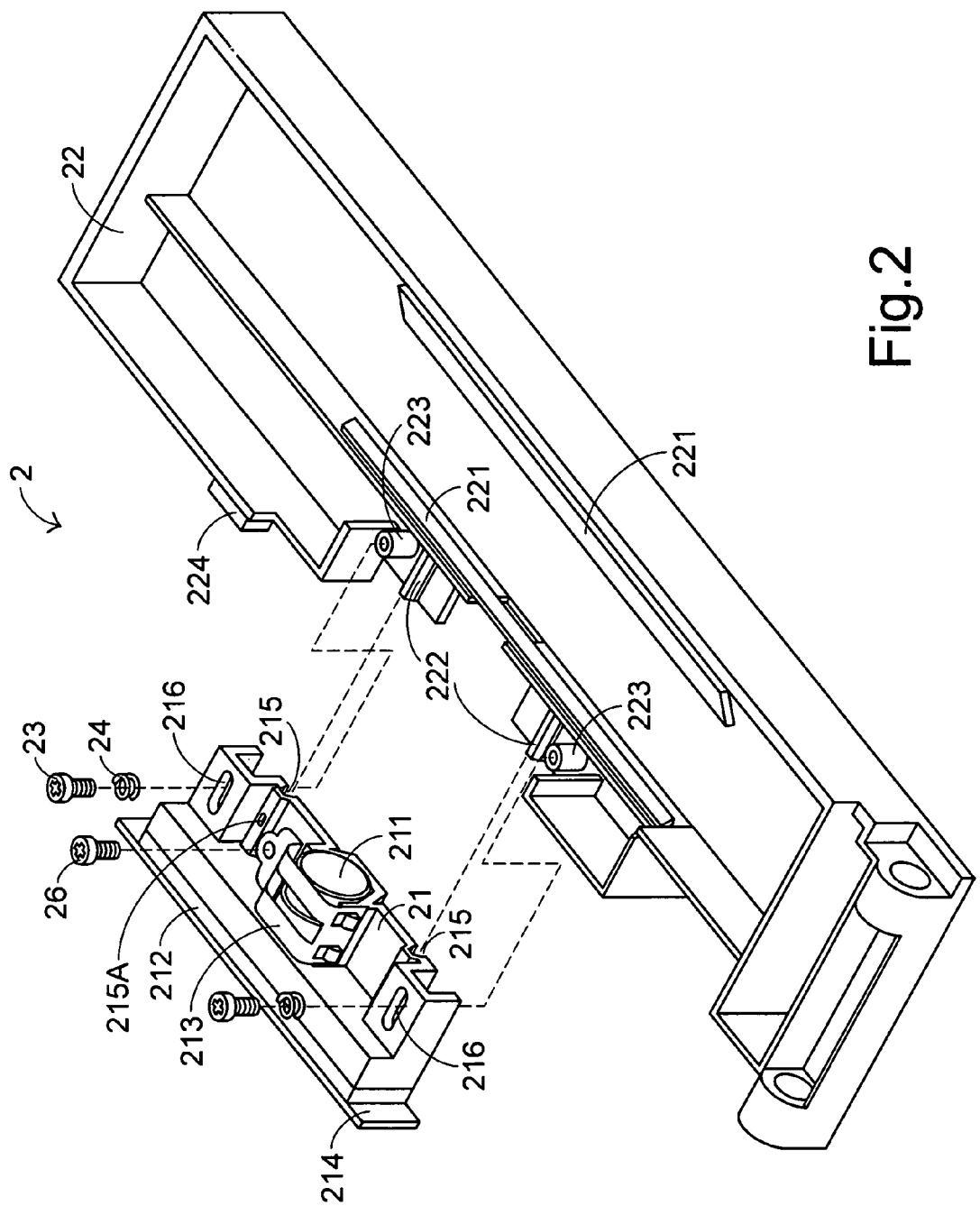
FIG. 2 is a schematic exploded view illustrating a reading device of a scanning apparatus according to a preferred embodiment of the present invention.

Referring to FIG. 2, a schematic view of a reading device of a scanning apparatus according to a first preferred embodiment of the present invention is shown. The reading device 2 of FIG. 2 comprises a sensing module 21 and a carriage module 22. The sensing module 21 comprises a lens 211 and an image sensor 212 therein. By means of a fixture member 213, the lens 211 is secured onto the sensing module 21. The sensing module 21 further comprises a perforation (not shown) under the lens 211 such that the assembler would stir the lens 211 through the perforation to move forwardly or backwardly in the optical path. An exemplary image sensor 212 is a charge couple device (CCD), which is fixed on the sensing module 21 along with a circuit board 214. Under this circumstance, the lens 211 and image sensor 212 are integrated into the sensing module 21. Furthermore, the sensing module 21 would be combined with the carriage module 22, as would be described later. On the surface facing to the carriage module 22, the sensing module 21 further comprises two V-shaped or U-shaped channels 215 at bilateral sides of the lens 211, and two guiding slots 216 disposed on external sides of the channels 215.

Please refer to FIG. 2 again. Within the carriage module 22, there are plural reflective mirrors 221 to form a mirror set. On the surface facing to the sensing module 21, the carriage module 22 further comprises two linear tracks 222 corresponding to the channels 215 and two bolt hole pedestals 223 corresponding to the guiding slots 216. By embedding the linear tracks 222 in corresponding channels 215, the guiding slots 216 would be disposed above corresponding bolt hole pedestals 223. The position of the sensing module 21 relative to the carriage module 22 is adjustable when the linear tracks 222 are moved along corresponding channels 215 and the guiding slots 216 is moved forwardly or backwardly in the optical path. The range of moving the sensing module 21 relative to the carriage module 22 is dependent on the length of individual guiding slot 216. Once the position of the sensing module 21 relative to the carriage module 22 is adjusted to a desired one, the sensing module 21 would be secured onto the carriage module 22 by penetrating two screws 23 through corresponding guiding slots 216 and screwing the screws 23 into corresponding bolt hole pedestals 223. Furthermore, a home sensor 224 is required to detect whether the reading device 2 is located at the desired position after the scanning operation is performed. Since the reading device 2 is a combination of the sensing module 21 and the carriage module 22, the home sensor 224 should be arranged on the carriage module 22, rather than on the circuit board 214 of the image sensor 212.

As previously described, in order to precisely image the object onto the image sensor, the assembler should repeatedly adjust the position of the lens relative to the image sensor in the optical path. Since the image distance and the objective distance are varied with the position adjustment, it is difficult to quickly achieve the desired magnification of the reading device. In contrast, the reading device of the present invention is assembled when the individual carriage module is combined with the individual sensing module, thereby simplifying the process of correcting the reading device. The process of correcting the reading device comprises the following steps. Firstly, the image distance is determined when the lens and the image sensor are included in the sensing module. Then, the sensing module is mounted on the carriage module. After the objective distance is adjusted to achieve the desired magnification, the sensing module would be fixed onto the carriage module. Furthermore, since the sensing module further comprises a perforation under the lens, the assembler would stir the lens through the perforation to move forwardly or backwardly in the optical path so as to adjust the image distance. By the way, when the image sensor and the circuit board are mounted on the sensing module, the objective distance can be adjusted by using a regular adjusting mechanism. The present invention has the advantage of achieving the desired magnification because the image distance is previously determined and then the objective distance is adjusted.

Figure 3:
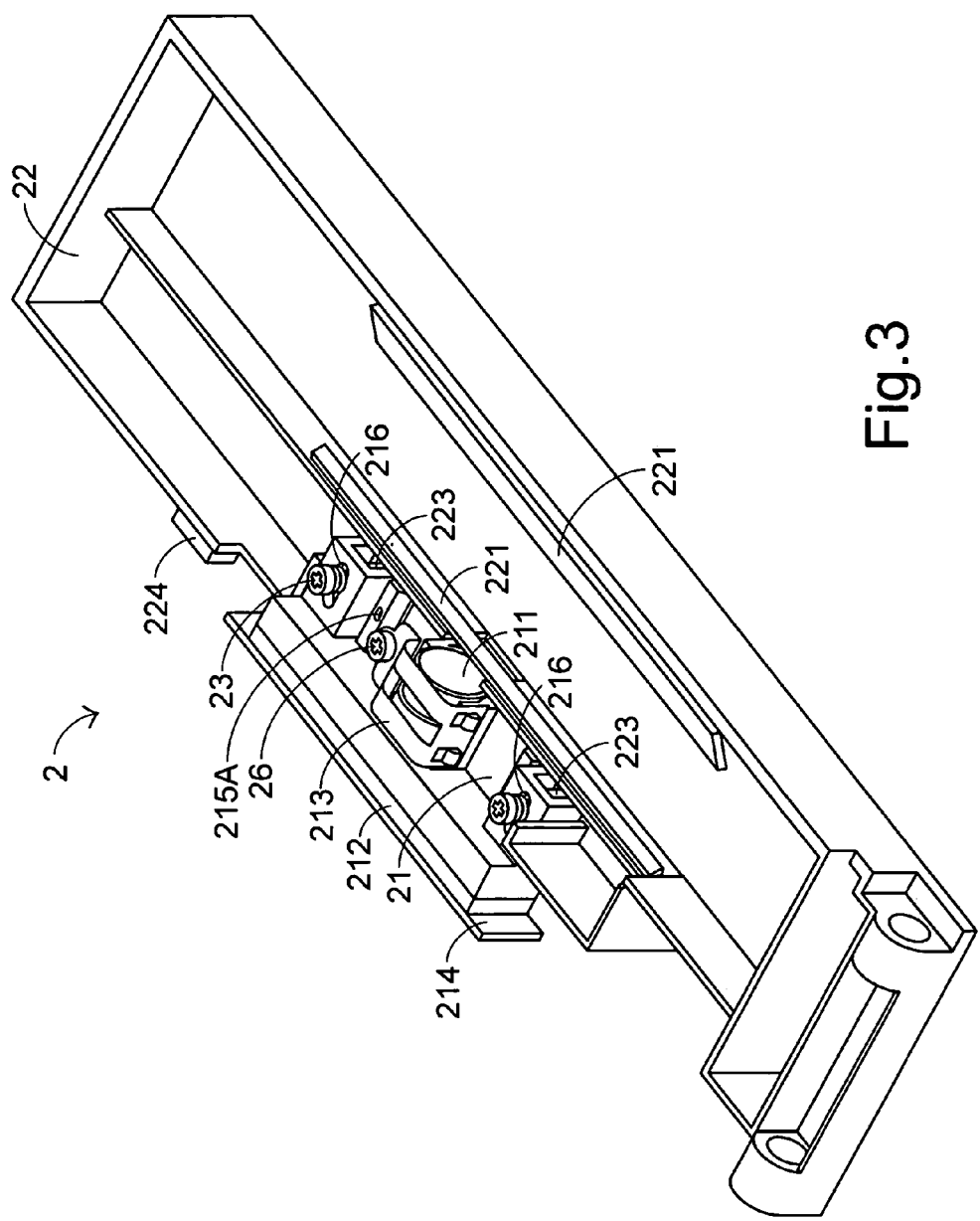
FIG. 3 is a schematic perspective view illustrating a reading device of a scanning apparatus according to a preferred embodiment of the present invention.

Please refer to FIG. 3. The sensing module 21 and the carriage module 22 are combined together by the screws 23. For a purpose of making tight contact between the sensing module 21 and the carriage module 22, a resilient element 24 such as a spring, resilient sheet or plastic ring may be arranged between each screw 23 and each guiding slot 216. Under this circumstance, when the screws 23 are screwed into the bolt hole pedestals 223, the pressing force provided by the resilient element 24 would facilitate tight contact between the sensing module 21 and the carriage module 22. Whereas, before the screws 23 have not been screwed into the bolt hole pedestals 223, the assembler may offer forward and backward movement of the sensing module 21 relative to the carriage module 22.

Please refer to FIGS. 2 and 3. The channel 215 of the sensing module 21 further comprises an injection hole 215A. A portion of the linear track 222 is exposed to the injection hole 215A when the sensing module 21 is combined with the carriage module 22. After the sensing module 21 is fixed onto the carriage module 22 by using the screws 23 to screw into the bolt hole pedestals 223, the assembler may inject a glue 25 into the injection hole 215A to facilitate the bonding effect between the sensing module 21 and the carriage module 22.

Figure 4:
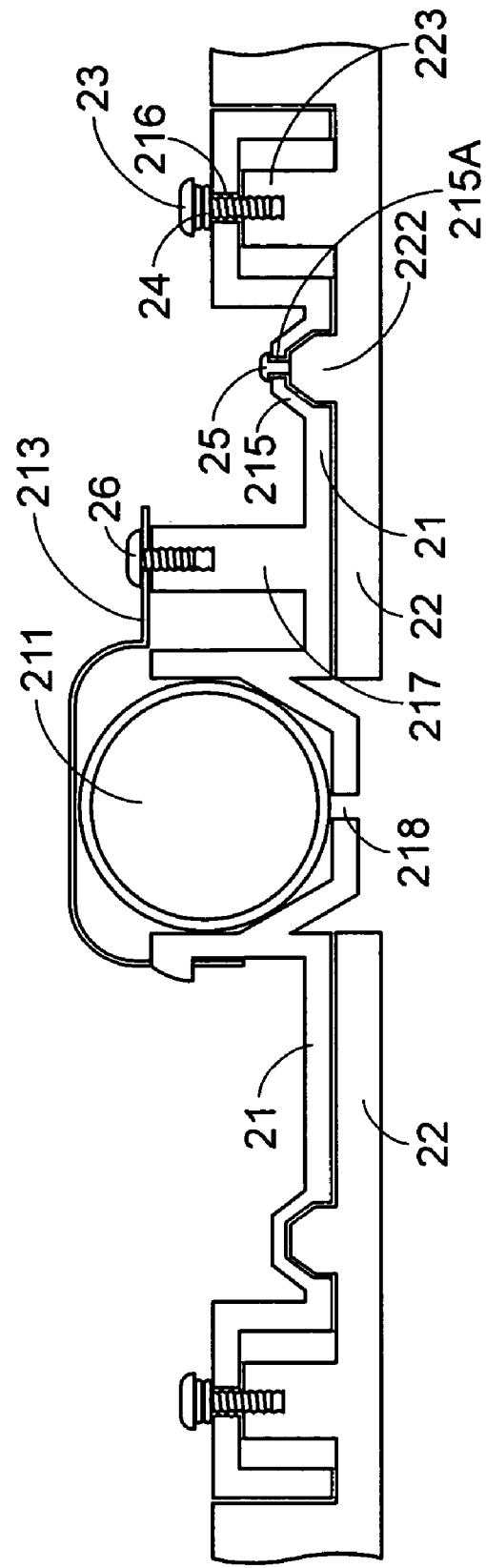
FIG. 4 is a schematic cross-sectional view illustrating the reading device of the present invention after the sensing module and the carriage module are combined together.

Please refer to FIG. 4, which is a schematic cross-sectional view illustrating the reading device 2 of FIG. 3 after the sensing module 21 and the carriage module 22 are combined together. As shown in FIG. 4, the linear tracks 222 of the carriage module 22 are embedded in corresponding channels 215 at bilateral sides of the lens 211 of the sensing module 21 such that the sensing module 21 would be smoothly glided on the carriage module 22. When the screws 23 sheathed by the resilient elements 24 penetrate through the guiding slots 216 and are screwed into the bolt hole pedestals 223, the pressing forces provided by the resilient elements 24 would facilitate tight contact between the sensing module 21 and the carriage module 22. In addition, another screw 26 penetrates through the fixture member 213 and is screwed into another bolt hole pedestal 217 such that the lens 211 is secured onto the sensing module 21. As is also shown in FIG. 4, a perforation 218 is disposed under the lens 211 such that the assembler would stir the lens 211 through the perforation 218, and the injection hole 215A is provided on the channel 215 of the sensing module 21 for injecting the glue 25 therevia.

In the above embodiments, the sensing module can be smoothly glided on the carriage module when the linear tracks of the carriage module are embedded in corresponding channels of the sensing module. Alternatively, in some embodiments, the linear tracks and the channels may be disposed on the sensing module and the carriage module, respectively.

While the invention has been described in terms of what is presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A reading device of a scanning apparatus, comprising:
   a sensing module comprising a lens and an image sensor, wherein said sensing module further comprises two channels at bilateral sides of said lens and two guiding slots disposed on external sides of said channels; and
   a carriage module comprising a mirror set, two linear tracks corresponding to said channels and two bolt hole pedestals corresponding to said guiding slots, wherein said sensing module is glided on said carriage module when said linear tracks are embedded in corresponding channels.

2. The reading device of a scanning apparatus according to claim 1 further comprising two screws penetrating through corresponding guiding slots and screwed into corresponding bolt hole pedestals such that sensing module is combined with said carriage module.

3. The reading device of a scanning apparatus according to claim 2 further comprising a resilient element arranged between each screw and each guiding slot.

4. The reading device of a scanning apparatus according to claim 3 wherein said resilient element is a spring.

5. The reading device of a scanning apparatus according to claim 1 further comprising an injection hole on each of said channels of said injection hole when said sensing module is combined with said carriage module.

6. The reading device of a scanning apparatus according to claim 1 further comprising a perforation formed in said sensing module such that said lens is accessible via said perforation when said sensing module is glided on said carriage module.

7. A method for assembling a reading device comprising:
adjusting the position of a lens relative to an image sensor, the lens and image sensor being mounted to a sensing module comprising two channels at bilateral sides of the lens and two guiding slots disposed on external sides of the channels;
mounting the sensing module to a carriage module comprising a mirror set, two linear tracks corresponding to the channels, and two pedestals corresponding to the guiding slots, such that the linear tracks are embedded in the corresponding channels;
adjusting the position of the sensing module relative to the carriage module; and
fixing the sensing module relative to the carriage module.

8. The method of claim 7, wherein adjusting the position of the lens relative to the image sensor comprises stirring the lens through a perforation in the sensing module.

9. The method of claim 7, wherein fixing the sensing module relative to the carriage module comprises injecting an adhesive into a hole formed in at least one of the two channels.

10. The method of claim 7, further comprising inserting fasteners through the guiding slots into engagement with the pedestals.

11. The method of claim 10, further comprising positioning biasing members between the fasteners and the sensing module, the biasing members urging the sensing module against the carriage module.

12. A reading device of a scanning apparatus, comprising:
a lens;
an image sensor;
a mirror set;
a first module comprising two channels located on opposite sides of the lens and two guiding slots; and
a second module comprising two linear tracks corresponding to the channels and two bolt hole pedestals corresponding to the guiding slots, wherein the first module is slidable relative to the second module when the linear tracks are embedded in corresponding channels; and
wherein the image sensor and lens are mounted to one of the first and second modules and the mirror set is mounted to the other of the first and second modules.

13. The reading device of a scanning apparatus according to claim 12 further comprising two fasteners penetrating through corresponding guiding slots and engaging the second module.

14. The reading device of a scanning apparatus according to claim 13 further comprising a resilient element arranged between each fastener and each guiding slot.

15. The reading device of a scanning apparatus according to claim 14 wherein the resilient element is a spring.

16. The reading device of a scanning apparatus according to claim 12 further comprising an injection hole on each of the channels of the injection hole when the first module is combined with the second module.

17. The reading device of a scanning apparatus according to claim 12 further comprising a perforation formed in the one of the first and second modules to which the lens is mounted such that the lens is accessible via the perforation when the first module is engaged with the second module.

18. A reading device of a scanning apparatus, comprising:
a sensing module comprising a lens and an image sensor, wherein said sensing module further comprises two channels at bilateral sides of said lens and two guiding slots; and
a carriage module comprising a mirror set, two linear tracks corresponding to said channels, wherein said sensing module is glided on said carriage module when said linear tracks are embedded in corresponding channels and wherein two fasteners extend through the two guiding slots and engage the carriage module.

19. The reading device of a scanning apparatus according to claim 18, wherein the sensing module further comprises bolt hole pedestals positioned corresponding to the two guiding slots and wherein the fasteners engage the bolt hole pedestals such that the sensing module is combined with the carriage module.

20. The reading device of a scanning apparatus according to claim 19 further comprising a resilient element arranged between each fastener and each guiding slot.

* * * * *